United States Patent [19]

Dogliotti

[11] 4,209,536
[45] Jun. 24, 1980

[54] FILLED FOOD PRODUCT AND METHOD OF MAKING SAME

[75] Inventor: Amilcare Dogliotti, Alba, Italy

[73] Assignee: P. Ferrero & C. S.p.A, Alba, Italy

[21] Appl. No.: 938,144

[22] Filed: Aug. 30, 1978

[30] Foreign Application Priority Data

Sep. 21, 1977 [IT] Italy ................ 69081 A/77

[51] Int. Cl.$^2$ ............................................. A21D 13/00
[52] U.S. Cl. ........................................ 426/94; 426/98; 426/281; 426/283; 426/559; 426/560; 426/568
[58] Field of Search ............... 426/89, 93, 103, 138, 426/281, 282, 558, 94, 559, 560, 96, 568, 614, 283, 98

[56] References Cited

U.S. PATENT DOCUMENTS

| | | | |
|---|---|---|---|
| 2,919,986 | 1/1960 | Johnson | 426/559 |
| 3,108,003 | 10/1963 | Powers | 426/103 |

FOREIGN PATENT DOCUMENTS

| | | | |
|---|---|---|---|
| 2328407 | 5/1977 | France | 426/103 |
| 46-5785 | 2/1971 | Japan | 426/138 |

*Primary Examiner*—S. Leon Bashore
*Assistant Examiner*—Peter Chin
*Attorney, Agent, or Firm*—Sughrue, Rothwell, Mion, Zinn and Macpeak

[57] ABSTRACT

A substantially spherical filled food product comprising an outer closed shell of pastry enclosing a soft filling. The shell is seamless and consists of an oven-baked yeast-less pastry having a humidity content not exceeding 1 wt.%. The shell has a coarse-cellular inner structure, with the cell size decreasing towards the exposed outer surface of the shell, said outer surface being substantially impervious to air and humidity. No yeast is used in the dough for the shell; the cellular structure-building aid in the dough is the white of egg. The outer diameter of the shell is from 10 mm to 20 mm, while the weight ratio of the filling to the shell is at least 2:1. The product is buoyant in commestible aqueous liquids such as fruit juice or milk.

9 Claims, 1 Drawing Figure

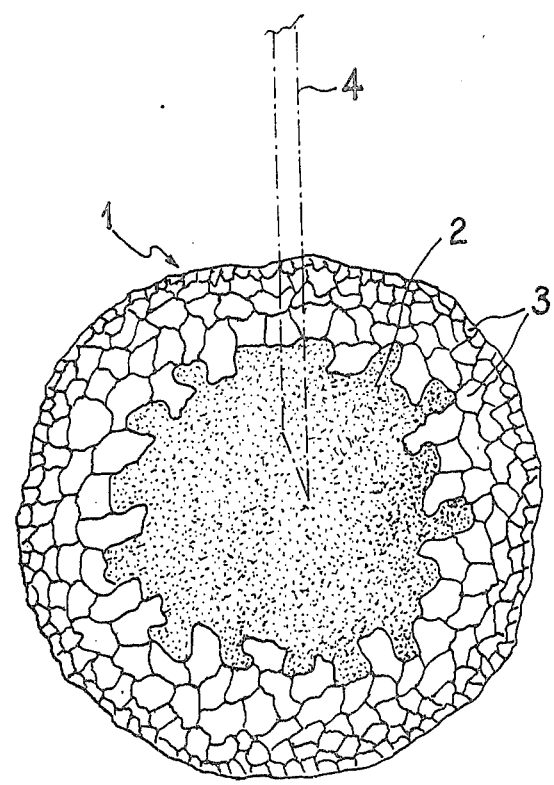

FILLED FOOD PRODUCT AND METHOD OF MAKING SAME

FIELD OF THE INVENTION

This invention relates to a small-sized, storable, filled food product comprising an outer shell of pastry enclosing a soft filling, and to a method of making the product.

BACKGROUND OF THE INVENTION

A great variety of food products is known to consumers in which an edible casing encloses an edible filling.

For example, filled chocolate candies comprise a chocolate casing enclosing a filling which may be liquid, semi-solid (creamy) or solid. The chocolate casing is frequently coated with a compact icing of sugar to prevent the chocolate from softening and smearing on grasping by hand. The proportion of the filling is usually substantial in that it amounts even to 50% by weight of the filled product.

In filled products made of dough the proportion of the filling is very low. For example, products known as "krapfen" are obtained by frying in boiling lard or oil a roundish lump of well-leavened dough, of a diameter of about 6-8 cm and even more; the final product is a soft, elastic piece weighing 60-70 g or more, containing a few grams of a filling typically consisting of a jam. Further for example, a laid-open German patent application No. 2,428,699 suggests a food product comprising a candy enclosed by a body of bread with the view to obtain a filled product having a strong bread character. The bread body in this product is obtained in conventional way, that is from a dough containing a leaven or yeast; thus, similarly to the ordinary bread, the product has a short shelf life only, mainly due to its humidity content which causes growth of molds and impairs the stability of the enclosed candy.

Also known are biscuits or crackers comprising a thin-walled biscuit envelope enclosing a soft edible mass, usually of chocolate or cheese. These products are made by first stamping a wafer plate with an array of recesses, filling the recesses with cheese- or chocolate mass, superposing on said plate a counter-plate of wafer and jointing the plates by sticking. This production technique is clearly expensive and time-consuming; also, obtention of small-sized "snacks" (e.g. of peanut size) is practically impossible on economical basis.

It is also to be noted that the known filled products made from dough easily absorb aqueous liquids; thus, they do not float on the surface of milk or fruit-juice, for example. Certain unfilled friers for soups, of a generally spherical- or drop shape, have a tendency to float; however, they are produced from dough lumps fried in boiling fat and, therefore, are impregnated by a high percentage of boiled fat which is seldom only desirable.

It is an object of this invention to provide a small-sized, storable, food product, preferably of a generally spherical shape, with a shell of baked dough enclosing a soft filling, having an outstandingly long shelf life, said product comprising a very substantial proportion of the filling (referred to the overall weight of the product) and being capable of floating on the surface of aqueous liquids such as fruit juice or milk without losing its consistency. Also, in accordance with a further object of this invention, the shell of the product should not be smearing or sticky, so that no icing or other coating is necessary to prevent smearing. A still more particular object of the invention is to provide the said product in the form of a ball of a size not exceeding (or not substantially exceeding) 2 cm, so that a charge of these balls may be factory-packaged in a sealed pocket-size bag of cellophane or the like without sticking therebetween and sold to the consumers similarily to sachets of peanuts, for example. A further object of this invention is to provide a process for making the said product.

SUMMARY OF THE INVENTION

In accordance with the objects stated hereinbefore the invention provides a substantially spherical filled food product comprising an outer closed shell of pastry enclosing a soft filling, characterized in that said shell is seamless and consists of oven-baked (that is, not fried in fat or oil) yeast-less pastry having a humidity not exceeding 1 wt.% and a relatively coarse-cellular inner structure in which the cell size decreases from the center towards the exposed outer surface of the shell so that the said outer surface is substantially impervious to humidity and air, further in that the cellular structure-building aid in the baked dough of the shell is the white of egg, further in that the outer diameter of the shell is substantially in the range of from 10 mm to 20 mm while the weight-ratio between the filling and the shell is at least 2:1, the product being buoyant in commestible aqueous liquids (such as milk or fruit juice).

The term "pastry" is used herein in its common accession, meaning articles obtained from dough. The dough, in the present case, does not contain a yeast or leaven and the cellular structure of the shell is not obtained by a gas ($CO_2$) produced by the action of said yeast or leaven on the flour contained in the dough. Rather, in the product according to this invention, the dough contains the white of egg intimately homogeneously distributed therein for the purpose of markedly contributing towards building of the cellular structure of the shell. The dough is not preliminarily raised. Rather, at an early stage of the cooking process in an oven the white of egg coagulates throughout the mass of dough thereby to readily entrap the bubbles of steam an air subsequently developing in the mass as the temperature of the latter increases to the baking value. The flour alone, in a not previously raised dough, would not provide this effect. The structure is coarse-cellular in that it is clearly distinguishable by naked eye despite of the small size of the shell.

According to a commercially advantageous embodiment the outer diameter of the filled product is from 12 to 17 mm.

The filling advantageously consists of a soft fatty mass, which is solid or semi-solid at ordinary temperatures (about 25° C.) but which becomes relatively flowable when heated at about 35° C. Examples of such filling are the known fatty cheese masses ordinarily used in cheese pastry. Another example resides in equally known filling masses containing cocoa products, such as nougat cream. The water content of these filling masses is generally below about 2 wt.% and, for the purposes of this invention, it is recommendable not to exceed the latter value and, accordingly, to avoid the use of water in the formulation of the filling masses.

As stated hereinbefore, the humidity content in the shell does not substantially exceed about 1 wt.% and, as was just explained hereinbefore, its cellular structure is not due to yeast or leaven (which in fact is not used) but rather to the white of egg present in the starting dough. Thus, the shell is crisp and the pleasance of the crispiness may advantageously be adjusted by using whole eggs (yolk and white) and an edible fat in formulating the dough. Any fat known in the field of pastry may be used. It is recommendable to use fats substantially exempt of water, such as lard or butter. However, as will be seen hereinafter, even such vegetable fats as margarines (frequently containing as much as 15–16 wt.% water) may successfully be used.

Typically, the whole egg proportion in the dough is substantial ly 2 parts by weight per 1 part by weight flour. It is not advisable to use less than 1 part, or more than 3 parts egg.

The fat proportion referred to the flour preferably is about 1:1. Proportions lower than about 0.5:1 may be used but do not produce particularly remarkable effects on the product; proportions higher than about 1.2:1 do not improve the results and an imponderate excess fat may be prejudicial to the baking process (as is generally known to pastrymakers). Minor ingredients, such as sugar, salt, flavourings, supplemental proteins, can be added. Obviously, water is also used.

The method according to this invention, for making the product described above is essentially characterized by the steps of: baking the said shell from a full lump of dough essentially consisting of flour, whole eggs and water; and injecting into the so obtained cellular piece of pastry the said filling.

Baking may be performed within a wide range of temperatures, such as from about 180° C. to about 280° C., preferably at 200°–230° C. The lump of dough substantially expands during baking; for example, a lump of about 10 mm diameter changes to a baked ball of a diameter of about 18 mm, having a cellular structure as defined hereinbefore. To obtain a ball, rather than a flat-bottomed piece, the lump is deposited into a hemispherical recess formed in a suitable support, e.g. in a stainless steel sheet. The cells in the core of the ball are large and their walls are very weak, as compared with the cells more proximal to the skin of the ball. This circumstance allows the injection, according to the invention, of a substantial amount of the filling, preferably by means of a hollow needle centrally into the ball. Thus, for example, 0.4 grams filling may be safely injected into a ball weighing only about 0.2 g. When the needle is withdrawn, there may be a little tendency of the filling to bleed out through the injection hole. To counteract this tendency, if present, it is advisable to terminate the injection process by a stage at which a few cubic millimeters of the injected mass are withdrawn by applying a suction to the needle just before or during the withdrawal of the latter from the ball. The filling mass is preferably injected warm, i.e. at about 25° C., and injection is advantageously performed when the balls discharged from the baking oven have cooled down to substantially the same temperature (35° C.), further cooling to room temperature being effected after the injection has been completed.

The baking time is inverse to the temperature and may vary from a few minutes to half an hour to inherently reduce the humidity content of the ball to 0.5–1 wt.%. At 200°–230° C. the baking time is about 8–10 minutes, also depending upon the actual recipe of the dough.

BRIEF DESCRIPTION OF THE DRAWING

The single Figure in the drawing schematically shows, in cross-sectional view and on enlarged scale, a filled food product according to this invention. Reference 1 denotes the shell of baked pastry enclosing a substantial amount of filling denoted by 2. The shell is substantially spherical and seamless (that is, formed integrally and, therefore, deprived of bonding lines such as would result e.g. from two hemispherical halves bonded together). Reference 3 denotes the cells of the shell, which are relatively coarse in proximity to the filling 2 and decrease in size towards the outer surface of the shell, the said surface being practically impervious to air and to aqueous liquids such as milk or fruit juices. Reference 4 denotes the position of the hollow needle during the injection of the filling.

DESCRIPTION OF A PREFERRED EMBODIMENT

A dough is prepared according to the following recipe:

| | |
|---|---|
| Flour (type O) | 17.0 kg |
| Whole eggs (yolk + white) | 35.0 kg |
| Vegetable fat (commercial margarine) | 18.0 kg |
| Milk protein (lactalbumin) | 1.0 kg |
| Cocoa press cake | 0.4 kg |
| Sugar, emulsifiers, flavourings | 0.6 kg |
| Water | 27.0 kg |
| | 100.0 kg |

The dough is preferably prepared by dispersing in hot water (27 kg) under agitation the entire amount of sugar, margarine, emulsifier, flavourings, milk protein and cocoa press cake. The flour is added under continued agitation until a homogeneous mass is obtained, whereupon the eggs are added under still continued agitation to perfectly homogenize the mixture. The baking pan consists of a stainless steel sheet formed with an array of 16×24 hemispherical recesses of a diameter of 20 mm. Portions of 0.6 grams each, of the dough are deposited into the recesses. Baking is effected at 230° C. during 8 minutes. Baked balls are obtained having an average weight of 0.2 grams, a diameter of about 15 mm, and a humidity content between 0.5 and 1 wt.%. The balls are left to cool to between 35° C. and 30° C., whereupon a fatty filling is injected into each ball by means of an array of hollow needles. The filling is a nougat cream prepared from the following ingredients.

| | |
|---|---|
| Sugar | 30 kg |
| Vegetable fat | 20 kg |
| Hazelnut | 30 kg |
| Skimmed milk powder | 16 kg |
| Cocoa press cake | 4 kg |
| | 100 kg |

The temperature of the filling mass is about 35° C. and its humidity content is below 2 wt.%. The injection needles have an outer diameter of 1.7 mm and inner diameter of 1.5 mm. The amount filling injected into each ball is 0.4 grams. No bleeding of the filling from the balls after withdrawal of the needle is observed. Nevertheless, suction is momentarily applied to the needles during withdrawal of the latter, merely to avoid leakage from the needles.

The filling/shell weight ratio in the filled balls obtained as above is 0.4/0.2, that is 2:1. The balls do not stick together or smear, are storable for at least two months and float on the surface of milk without being appreciably soaked.

Generally speaking, the filled food product according to this invention offers several relevant advantages over comparable prior art products. Since the shell is relatively thin and crisp while the filling is soft, a pleasant chewing feeling arises when the product is eaten. Since relatively small proportions are involved, the nutritive value is (or may be kept) low as compared for example with a filled chocolate candy of comparable volume, with or without sugar icing, containing the same filling. The extremely low water percentage in the shell of the present product allows a long shelf life, which latter is also due to the substantial imperviousness of the outer surface of the product to humidity and air (so that staling of the filling due to oxydative changes is substantially prevented). In addition thereto, the shell is dimensionally stable and provides for the filling an efficient mechanical protection, so that the filling may be pleasantly soft and the use of undesirable hard fats (e.g. stearic acid fats as used in filled chocolate candies) is avoided; the latter is a substantial advantage from the dietetic viewpoint. Also, since the shell is integral, the manufacturing process is quick and simple.

What I claim is:

1. A substantially spherical filled food product comprising an outer closed shell of pastry enclosing a soft filling, said shell being seamless and consisting of an oven-baked yeastless pastry which is a baked mixture of flour, whole eggs and edible fat having a humidity content not exceeding 1% by weight and a relatively course-cellular inner structure in which the cell size decreases from the center towards the exposed outer surface of the shell so that said outer surface is substantially impervious to humidity and air and said product is buoyant in commestible aqueous liquids, said shell having an outer diameter in the range from 10 mm to 20 mm with the egg matter content in the shell corresponding to a ratio of the whole egg to flour from 1:1 to 3:1 by weight and the cellular structure-building aid in the baked dough of the shell consisting of the white of egg and said filling containing an amount of humidity substantially not exceeding 2% by weight while the weight-ratio of the filling and shell is at least 2:1.

2. A food product as set forth in claim 1, wherein said outer diameter is from 12 mm to 17 mm.

3. A food product as set forth in claim 1, wherein said filling consists of a solid or semi-solid fatty composition.

4. A method of making a filled food product as defined in claim 1, comprising the steps of baking said shell from a full lump of a yeast-less dough consisting essentially of flour, whole eggs and edible fat and water at a temperature from 180° C. to 280° C. until the humidity content of the material being baked is reduced to a value not exceeding 1% by weight with the egg to flour ratio in the dough being from 1:1 to 3:1 by weight and injecting said filling into the resulting baked cellular piece of pastry.

5. A method as set forth in claim 4, wherein the baking temperature is in the range from 200° C. to 230° C. and the baking time is 8–10 minutes.

6. A method as set forth in claim 4, wherein said filling is a fatty composition which is injected into said shell in a warm condition.

7. A method as set forth in claim 6, wherein the temperature of the baked piece of pastry during injection is substantially equal to the temperature of the filling being injected.

8. A method as set forth in claim 4, further comprising terminating the injection step by withdrawing a small proportion of the injected filling.

9. A method as set forth in claim 8, wherein the injection is performed by means of a hollow needle.

* * * * *